(12) United States Patent
Tsai

(10) Patent No.: US 6,525,832 B1
(45) Date of Patent: Feb. 25, 2003

(54) DUAL PURPOSE PRINTER INTERFACE DEVICE FOR A PRINTER AND A JOYSTICK TO A HOST COMPUTER

(75) Inventor: Hsi-Jung Tsai, Hsinchu Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/306,347

(22) Filed: May 6, 1999

(30) Foreign Application Priority Data

Apr. 16, 1999 (TW) ...................................... 88205924 U

(51) Int. Cl.⁷ .......................... G06F 15/00; G06F 13/00
(52) U.S. Cl. ........................ 358/1.15; 710/316; 710/8
(58) Field of Search ...................................... 358/1.15

(56) References Cited

U.S. PATENT DOCUMENTS 5,513,302 A * 4/1996 Tsai ........................... 358/1.15
5,717,957 A * 2/1998 Lin ............................. 710/16

* cited by examiner

*Primary Examiner*—Edward Coles
*Assistant Examiner*—Alan Rahimi
(74) *Attorney, Agent, or Firm*—J. C. Patents

(57) ABSTRACT

A dual purpose printer interface device has a printer connector, a printer interface, a joystick interface, a power generator, a mode selection circuit and a selection device. The mode selection circuit to automatically select the desire mode so that once the printer or the joystick are plugged into the printer connector the mode selection circuit automatically generate the proper mode selection signal to switch the operation mode. Users can just simply plug in the printer or the joystick without any further action to switch the operation mode.

17 Claims, 5 Drawing Sheets

DUAL PURPOSE PRINTER INTERFACE DEVICE FOR A PRINTER AND A JOYSTICK TO A HOST COMPUTER

CROSS-REFERENCE TO RELATED APPLICATION

This application claims the priority benefit of Taiwan application serial no. 88205924, filed Apr. 16, 1999, the full disclosure of which is incorporated herein by reference.

BACKGROUND OF THE INVENTION

1. Field of the Invention

This invention relates to a computer interface device for periphery device, and more particularly to a dual purpose printer interface device for a printer and a joystick to a host computer, in which the dual purpose printer interface device is used by the printer or the joystick to immediately perform their function once they are plugged in.

2. Description of Related Art

Currently, it is a trend to fabricate a personal computer (PC) to be a greatly reduced dimension with, for example, light, thin and small properties. A portable PC, such as a notebook PC has been a common commercial product already, in which a sub-notebook PC or even a palm PC are also available in the current portable computer products. Even though most of functions of the desk computer are transferred to the portable computer, the portable PC lacks a connector for a joystick, which is commonly used to play computer games in the desk PC. That is because the portable PC is limited by its greatly reduced dimension, resulting in an insufficient space to accommodate a joystick by providing, for example, extra 15 pins for joystick connection. So far, the portable PC usually has no individual connector for the joystick even though the joystick is also fabricated with a reduced size. One conventional solution is that the control functions are installed in the keyboard, typically, on those rare used or even often used keys. This method disturbs the normal functions of the keyboard and also causes an inconvenient use to control the moving direction. Another solution is further proposed as described in U.S. Pat. No. 5,513,302, which provides an interface device with a basic input output system (BIOS), serving as a switch, commonly used by a printer and the joystick. This method needs an action to switch operation modes between driving the printer and the joystick. It may also cause a certain degree of inconvenient use.

FIG. 1 is a block diagram, schematically illustrating a conventional printer interface between a printer and a portable computer. In FIG. 1, a printer interface 10 includes a connector 16 that typically has 25 pins, a printer data register 11, a printer control register 12, a printer status register 13, an address-decoder & read/write controller 14, and a bus driving means 15. The printer data register 11 includes eight connecting lines PD0–PD7. The printer control register 12 has four connecting lines: STROBE (STB), AUTO FD XT (AFD), INIT and SLCTIN (CLIN). The printer status register 13 has five connecting lines: ACK, BUSY, PE, SLCT, and ERROR (ERR). The these three registers 11, 12, and 13 are electrically connected to the connector 16, and each of the registers 11, 12, and 13 separately receives an address signal from the address-decoder & read/write controller 14, which also communicates with a potable host computer through address lines AS0–SA9, and two input/output (I/O) lines IOR and IOW respectively for read and write. The host computer 17 also communicates with the bus driving means 15, which is connected to the printer data register 11.

FIG. 2 is a block diagram, schematically illustrating a conventional joystick interface device. In FIG. 2, the host computer 17 of FIG. 1 sends an address to a address decoder 23 through the address lines SA0–SA9, which is decoded into an enable signal GMCS. The GMCS is compared with an I/O read (IOR) signal and an I/O write (IOW) signal to separately produce a GMRD signal and a GMWR signal. The GMCS signal determines which signal is enabled. If the GMWR signal is enabled, it is sent to an one-shot circuit 22 to first clear voltage set values for the X-axis and Y-axis of a joystick and then start. The one-shot circuit 22 serving as an game interface is coupled to a game port 21 through a resistor PR3 on four output lines T/A–T/D, which are also respectively coupled to grounded capacitors C5–C8 before the resistor PR3. As a result, a RC circuit is formed and is coupled, in series, to the variable resistors (not shown) for the X-axis and Y-axis of the joystick, which is connected on the game port 21. The charges are gradually accumulated, resulting in a raise of voltage as shown in FIG. 3. FIG. 3 is a voltage waveform, schematically illustrating the voltage levels of several control signals varying with the time. In FIG. 3, the voltage level of the TA/TB signal gradually rises at time periods C and D, which are also the time periods for game reading operation controlled by a signal D0/D1. Once the TA/TB reaches a preset voltage value, the one-shot circuit 22 (FIG. 2) is triggered and the TA/TB voltage level is reset to zero.

The variable resistors of the joystick can be changed by shifting its X-Y location. By the actual resistance of the variable resistor, the rising slope of the TA/TB is changed. A small shift distance of the joystick causes only a little change of the variable resistance, causing a larger rising slope. The one-shot circuit 22 therefore needs a shot time to be triggered. On the contrary, if the X-Y location shift is large, the trigger time is accordingly long. The trigger time usually varies within a few milliseconds of difference. During the trigger time, the GRMD of FIG. 2, continuously exports, such as one per few hundred ns, and reads and accumulates the status of the one-shot circuit 22. Before the one-shot circuit 22 is triggered, all read status are equal to 1 so that the actual shifted distance of the joystick can be estimated. In this conventional method, the one-shot circuit 22 has to send its data of the joystick shift to a computer bus through a bus driving circuit 24.

Due to a fact that the current portable computers have no extra space to provide 15 pins for uses of the joystick, how to make use its current available connector for multiple uses so as to include, for example, the function of the joystick is a developing goal. In the U.S. Pat. No. 5,513,302 as mentioned above, the printer connector can be shared with the joystick but it needs a switch action for each time of change. This still gives a little inconvenient as is, so called, user unfriendly.

SUMMARY OF THE INVENTION

It is at least an objective of the present invention to provide a dual purpose printer interface device, which is used by a printer or a joystick to immediately perform their function once they are plugged in. Whether the printer or the joystick are automatically recognized and a desired operation mode is automatically switched by the device.

In accordance with the foregoing and other objectives of the present invention, a dual purpose printer interface device is provided. The dual purpose printer interface device includes at least a printer connector with several pins, a printer interface, a joystick interface, a power generator, a mode selection circuit and a selection device.

The printer connector is used to connect to a printer. The printer interface is used to transmit desired data from a host computer to the printer for printing and printer control signals to the printer. The printer also responds a printer status signal to the host computer through the printer interface. The joystick interface is used to receive action signals from a joystick and accordingly export signals to the host computer. The power generator provides a power source for the joystick. The selection device further includes a first selector and a second selector. The first selector is connected to the host computer, the printer interface, and the joystick interface so that the first connector can connects one of the printer and the joystick to the host computer according to a mode selection signal. The second selector is coupled to the printer connector, the power generator, the printer interface, and the joystick interface so that the printer connector is selectively connected to the printer face, the joystick interface, and the power generator according to the mode selection signal. The mode selection circuit is coupled to the printer connector at some of its the pins, which preferably are those usually grounded pins, to produce the mode selection signal, which is sent to the first selector and the second selector of the selection device.

In the foregoing, the printer interface further includes a printer data register, a printer control register, and a printer status register so as to temporarily register all needed information for the communication between the host computer and the printer. The first selector further includes a first multiplexer and a switch circuit so as to achieve its switching function. The first multiplexer can selectively connect the host computer with either the printer interface or the joystick interface according to the mode selection signal.

The second selector further includes a second multiplexer and a third multiplexer. The second multiplexer, according to the mode selection signal, receives the data from he printer data register and transmits the data to the printer connector. The third multiplexer receive the control signals from the printer control register and transmits the control signals to the printer connector also so as to control the operation of the printer.

Moreover, if the mode selection signal determines an operation mode for the joystick, the second multiplexer receives signals from the joystick through the printer connector and exports the signal information to the joystick interface. The third multiplexer receives a power from the power generator so as to provide the necessary power to the joystick through the printer connector. For example, the joystick typically has an adapter with 15 pins, which can be converted into the type of the printer connector with several pins, such as 25 pins, through a connector converter.

The mode selection circuit includes a gate logic circuit, which is coupled to some pins of the printer connector so as to properly produce the mode selection signal. The connected pins are also connected to a voltage source Vcc through pull-up resisters. Since the pints 18–25 are usually grounded for a normal use of the printer. The connected pins are preferably the $18^{th}$ and the $25^{th}$ pins as a preferred example. The actual connection of the pins is changeable depending on the actual need of operation. The joystick can also replaced by other periphery device, in which case the joystick interface is necessary to be accordingly modified.

In conclusion, the invention uses the mode selection circuit to automatically select the desire operation mode so that once either the printer or the joystick are plugged into the printer connector the mode selection circuit automatically generate the proper mode selection signal to switch the operation mode. Users can just simply plugs in the printer or the joystick as thy want without any further action to switch the operation mode.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

Figure 4:
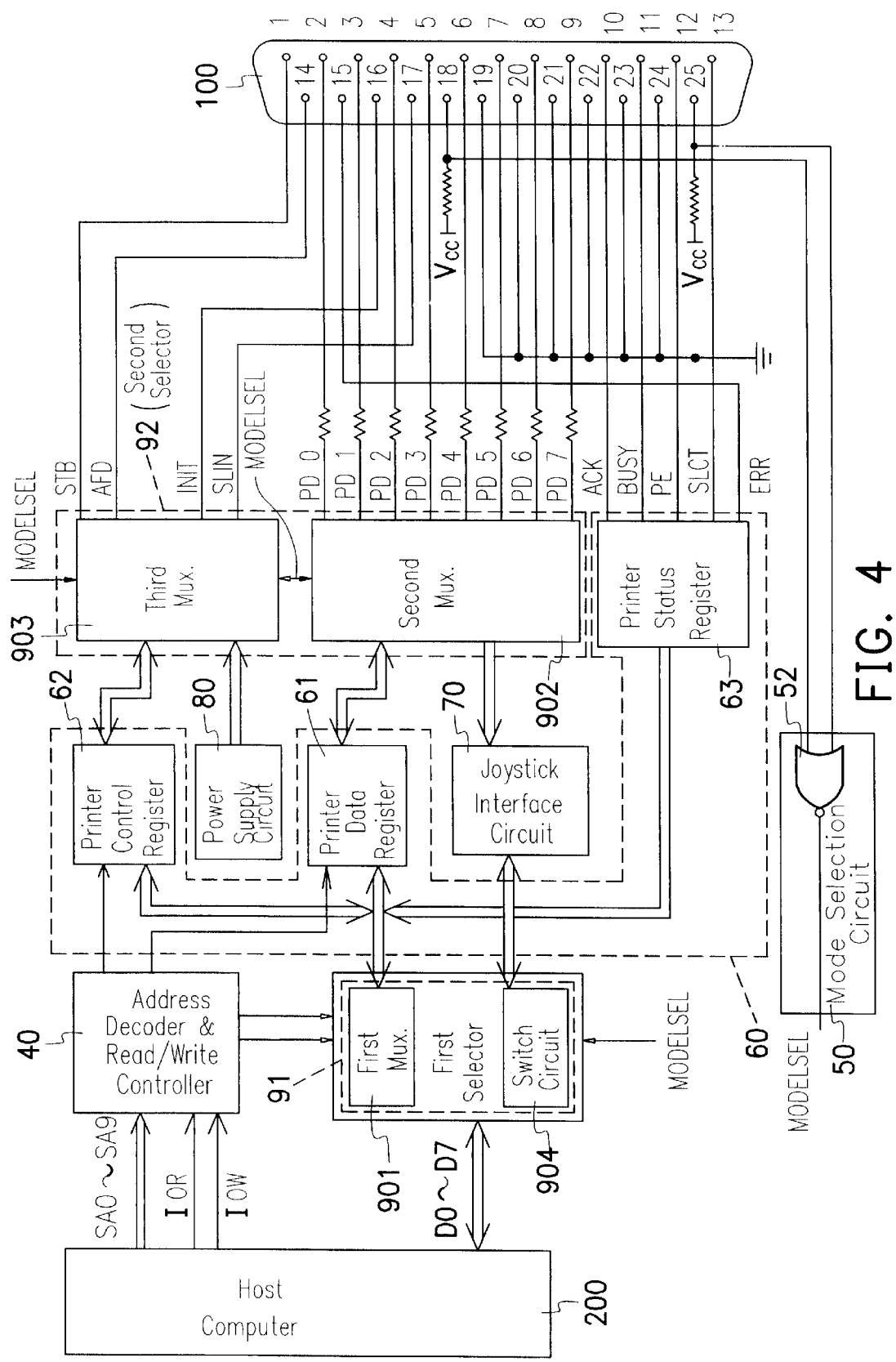
FIG. 4 is a block diagram, schematically illustrating a dual purpose printer interface used by a printer and a portable computer to perform their function once they are plugged in, according to a preferred embodiment of the invention.

FIG. 4 is a block diagram, schematically illustrating a dual purpose printer interface device used by a printer and a portable computer to perform their function once they are plugged in, according to a preferred embodiment of the invention. In FIG. 4, the dual purpose interface device includes a mode selection circuit 50, a printer interface 60, a joystick interface circuit 70, a power generator 80, a selection device that includes a first selector 91 and a second selector 92, and a printer connector 100 with 25 pins. A printer (not shown) can be connected to the printer connector 100. The printer usually just used pins 1–17, and the other pins 18–25 are usually grounded. A joystick (not shown) can be also connected to the printer connector 100, in which the pin 18 and pin 25 are, for example, coupled to a voltage source Vcc through pull-up resisters. The choice of pins 18 and 25 is to avoid an unexpected wrong connection. The actual implementation is not limited to only two pins 18 and 25 and can modified into the actual need with desire pin number. For the case in FIG. 4, only the pins 18 and pin 25 are used to distinguish the connected one to be the printer or the joystick through hardware method. Detail descriptions are following.

The mode selection circuit 50 including a logic gate, such as a NOR gate 52, is coupled to the pins 18 and 25 and produces a mode selection signal (MODESEL) that is used to switch the operation mode of the interface device. When the printer is connected. The pins 18 and 25, which are originally high, are brought down to a low voltage level. The NOR gate 52 produces the MODESEL with a high voltage level. This is for the printer called as a first operation mode. Otherwise the MODESEL with a low voltage level is the joystick called as a second operation mode, in which the joystick typically include only 15 pins and does not uses the pins 18–25. The pins 18 and 15 stay high. The type of the logic gate 52 can be properly modified to use any pins of the printer connector, if the used pins provides sufficient information to distinguish the connected printer or the joystick without affect their original performance. The joystick can even be replaced by other type of product with similar properties. Once the operation mode can be automatically detected, the interface with respect to selected one can be properly arranged.

Figure 2:
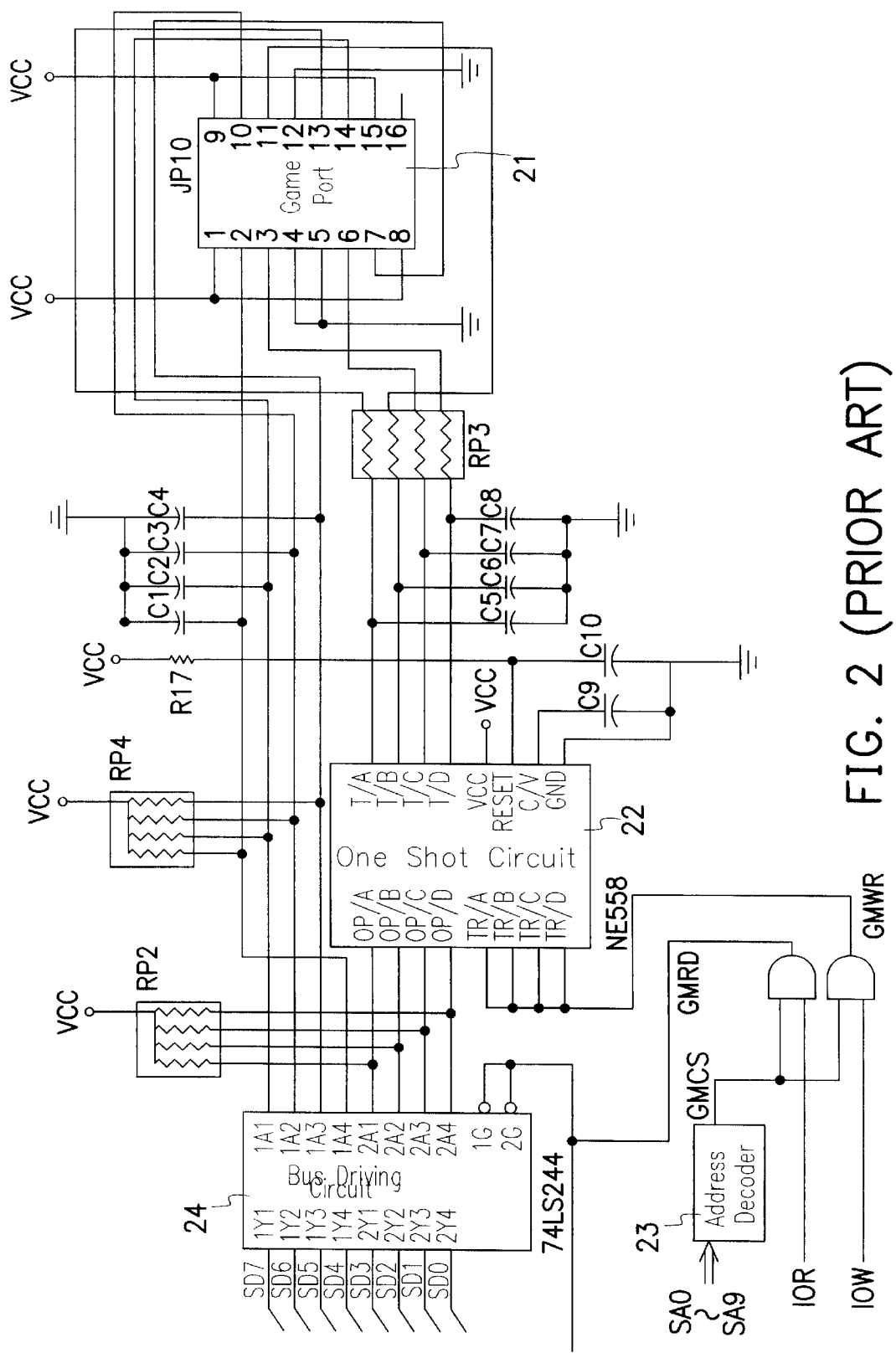
FIG. 2 is a block diagram, schematically illustrating a conventional joystick interface device.
Figure 3:
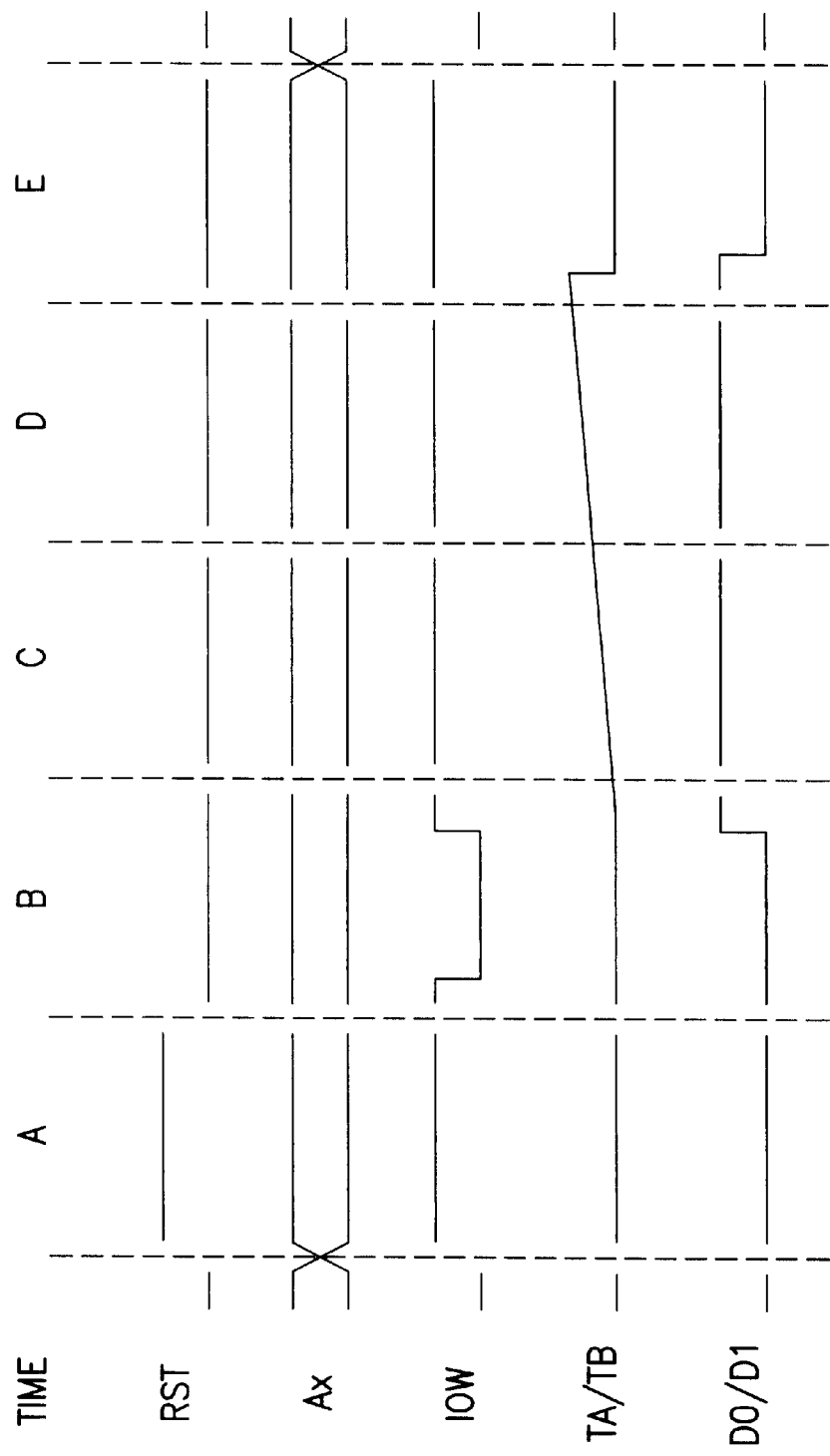
FIG. 3 is a voltage waveform, schematically illustrating the voltage levels of several control signals varying with the time.

In FIG. 4, the printer interface 60 includes, for example, a printer control register 62, a printer data register 61, and a printer status register 63. The printer data register 61 includes eight lines PD0–PD7 for transmitting data to be printed. The printer control register includes four lines for transmitting the control signals: STROBE (STB), AUTO FD TX (AFD), INIT, and SLCTIN (SLIN). The printer status register includes five lines: ACK, BUSY, PE, SLCT, and ERR. In total, the printer include 17 lines with respect to 17 pins of the printer connector 100. The joystick interface circuit 70 as also shown in FIG. 2 includes the game port 21, the one-shot circuit 22, and the bus driving circuit 24.

A power generator 80, that is, a power supply circuit 80 is used to provide the required power source to the joystick as is to be described later.

Figure 5:
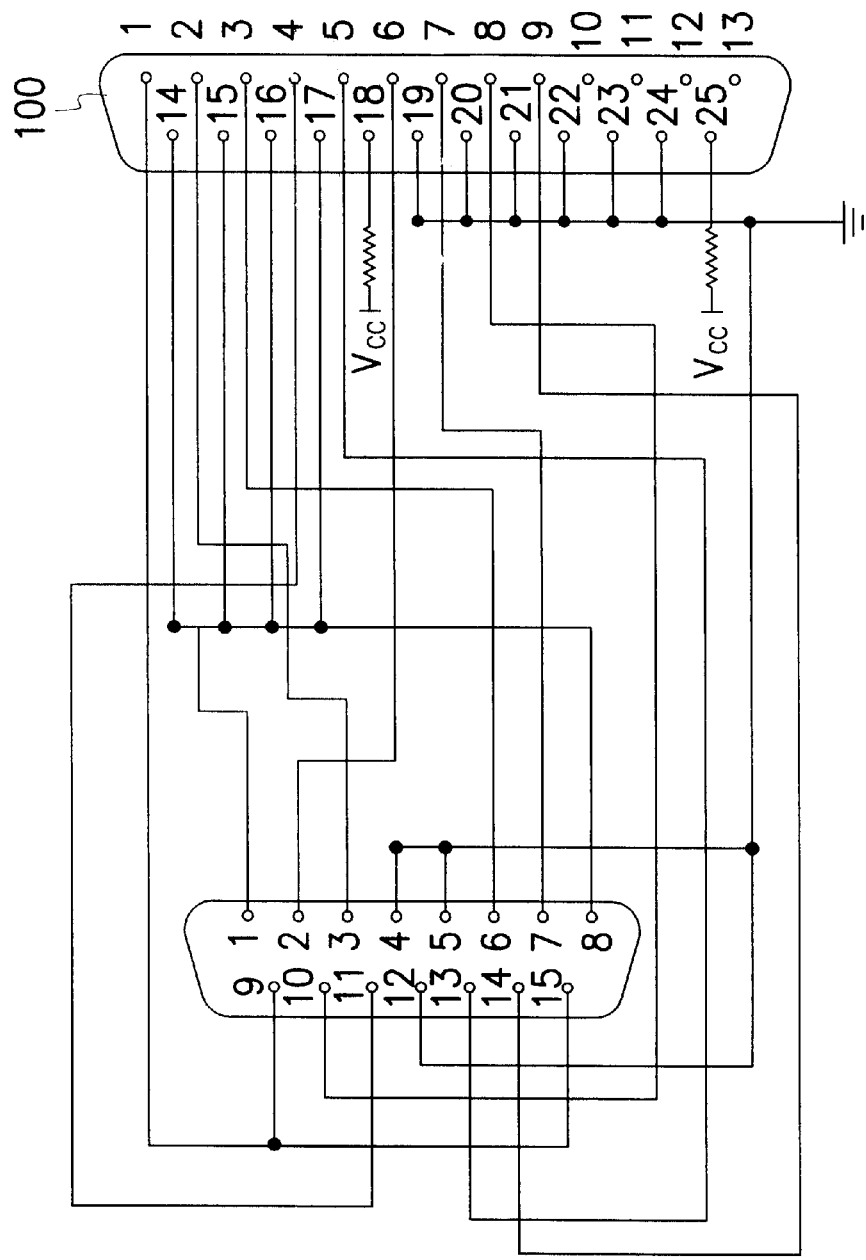
FIG. 5 is a plot, schematically a converting configuration between the printer connector with 25 pins and a joystick adapter with 15 pins, according to the preferred embodiment of the invention.

Before describing the connecting configuration and operation, a connection converter is described first. The joystick typically includes 15 pins, which can be connected to the printer connector 100 through the connection converter as shown in FIG. 5. Its connection scheme is listed in table 1.

TABLE 1

| Signal line | Contacts of Adapter | Contacts of Printer connector |
|---|---|---|
| Vcc | 1, 8, 9, 15 | 1, 14, 15, 16, 17 |
| V0 | 3 | 2 |
| V1 | 6 | 3 |
| V2 | 11 | 4 |
| V3 | 13 | 5 |
| V4 | 2 | 6 |
| V5 | 7 | 7 |
| V6 | 10 | 8 |
| V7 | 14 | 9 |

Figure 1:
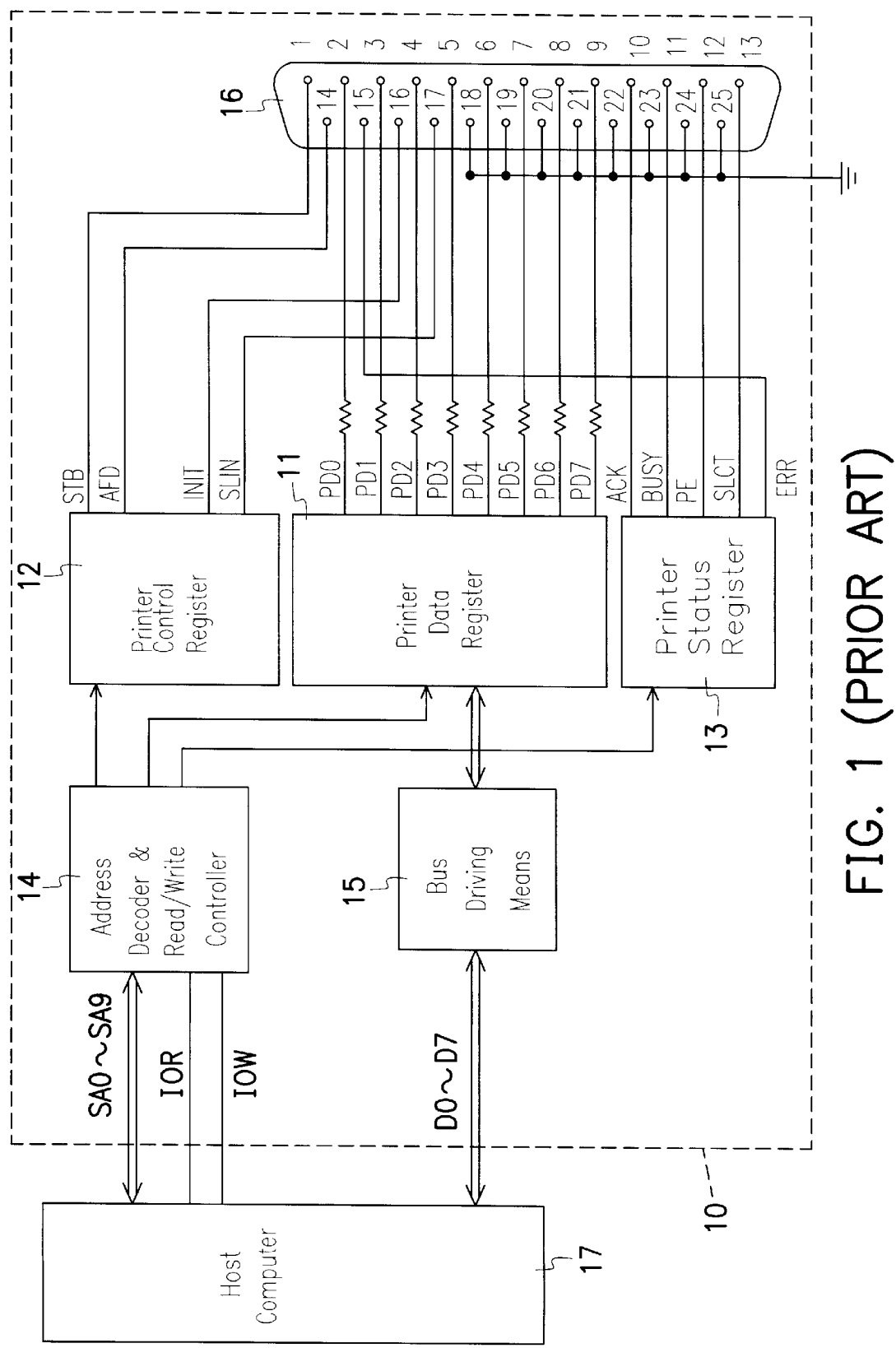
FIG. 1 is a block diagram, schematically illustrating a conventional printer interface between a printer and a portable computer.

The selection device includes the first selector 91 and the second selector 92, in which the first selector further includes a first multiplexer 901 and a switch circuit 904, and the second selector further includes a second multiplexer 902 and a third multiplexer 903. The first selector 91 communicate with the host computer 200 through data lines D0–D7. The first multiplexer 91 further communicate with the printer data register 61, the printer control register 62, the printer status register 63 and the joystick interface circuit 70, and receives the MODESEL and also address control signals from an address-decoder & read/write controller 40, which receives address signals, an IOR, and an IOW from a host computer as described in FIG. 1. The address-decoder & read/write controller 40 exports control signals to the printer control register 62 and the printer data register 61. The printer data register 61 can also communicate with the printer control register 62 through bus lines, and the printer status register 63 can also return status signals to the first selector 91 and the printer data register 61. The second multiplexer 902 can communicate with the printer data register 61, and the third multiplexer 903 can communicate with the printer control register 62. As previous mention, the four control signals of the printer control register 62 are connected to the printer connector 100 through the third multiplexer 903, the eight data lines PD0–PD7 are connected to the printer connector 100 through the second multiplexer 902, and the five status signals of the printer status register 63 are directly connected to the printer connector 100.

The joystick interface circuit can receive signals from the second multiplexer 902 and communicate with the first selector 91. The power supply circuit 80 can provide the driving power to the joystick through the third multiplexer 903 and further through the printer connector 100.

According to the above coupling architecture, two operation modes can be operated:

For the first operation mode for the printer use, once the printer is plugged into the printer connector 100, the MODESEL generated by the mode selection circuit 50 becomes high and is distributed to the first selector 91 and the second selector 92 of the selection device. The first multiplexer 901 enables the switch circuit 904 so as to form a data route between the host computer 200 and the printer data register 61 of the printer interface 60 for transmitting data for printing through the data lines D0–D7. As a result, the printer control register 62 and the printer data register 61 respectively sends the control signals and the data to the printer through the third multiplexer 903 and the second multiplexer 902. The printer responds a print status to the host computer 200 though the printer status register 63 and the first selector 91.

For the second operation mode of the joystick, once the joystick is plugged into the printer connector 100 through the connection converter of FIG. 5, the MODESEL stays low. This tells that the joystick is desired. The multiplexer 901 then switch off the switch circuit 904 and form a passing route between the host computer 200 and the joystick interface circuit 70. In this manner, the power supply circuit 80 supplies the required power for the joystick through the third multiplexer 903 and the printer connector 100. The MODESEL signal also controls the second multiplexer 902 to stop communicating with the printer data register 61 but to communicate with the joystick interface circuit 70. The shift information of the joystick therefore are sent to the joystick stick interface circuit 70 and further to the host computer 200 through the first selector 91.

In conclusion, the invention provides a hardware method to automatically detect whether the printer or the joystick is desired so that the dual purpose printer interface can automatically set up a transmitting route to the host computer. The joystick therefore can be very conveniently equipped with the portable computer or other periphery products.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A dual purpose printer interface device, which is suitable for use of a printer or a joystick to connect to a computer, the dual purpose printer interface device comprising:

a printer connector with a plurality of pins for connecting the printer or the joystick, wherein the joystick is connected to the printer connector through a connection adapter;

a printer interface, used to transmit data and instruction signals from the computer to the printer for printing, and transmit a printer status signal responded by the printer to the computer;

a joystick interface, used to receive motion signals from the joystick and transmit the motion signals to the computer;

a selection device, including a first selector and a second selector, wherein the first selector is connected to the computer, the printer interface and the joystick interface so as to select one of the printer or the joystick to be connected to the computer according to a mode selection signal in which the first selector also receives the instruction signals generated by the computer, and the second selector is connected to the printer connector, the printer interface, and the joystick interface so as to connect the printer interface, and the joystick interface to the printer connector according to the mode selection signal; and a mode selection circuit, which is connected to the printer connector at least one of the pins so as to automatically distinguish which one of the printer or the joystick is connected to the printer connector through a voltage level of the connected pin and produce the mode selection signal (MODESEL) that is at least distributed to the first selector and the second selector of the selection device so as to switch the printer interface device into a printer operation mode or a joystick operation mode.

2. The printer interface device of claim 1, wherein the computer comprises a portable computer.

3. The printer interface device of claim 1, wherein the printer interface further comprises:

a printer data register;

a printer control register; and a printer status register, in which when the MODESEL selects the printer operation mode, the printer data register receives the data and transmits the data to the printer through the second selector an the printer connector, the instruction signals are sent to the printer control register and the printer data register to control data transmission, and the printer status register receive a printing response signal from the printer connector and transmit the printing response signal to the computer through the first selector.

4. The printer interface device of claim 1, wherein the first selector further comprises a first multiplexer and a switch circuit, in which the first multiplexer select one of the printer interface or the joystick interface to be connected to the computer according to the MODESEL.

5. The printer interface device of claim 1, wherein the second selector comprises a second multiplexer and a third multiplexer, in which the second multiplexer communicates with the data transmitted and the joystick interface, and the third multiplexer communicates with the printer control register and receives a power from a power generator, wherein when the MODSEL selects the printer operation mode, the second multiplexer transmits printer control signals outputted from the printer control register to the printer at the printer connector, and the third multiplexer transmits the data from the printer data register to the printer for printing, and when the MODSEL selects the joystick operation mode, the second multiplexer receives the motion signals from the connected joystick and transmits the motion signals to the joystick interface, and the third multiplexer transfers the power to the joystick through the printer connector.

6. The printer interface device of claim 1, wherein the mode selection circuit comprises a logic gate circuit connected to the at least one pin of the printer connector so as to automatically distinguish the printer or the joystick when one of them is connected to the printer connector.

7. The printer interface device of claim 6, wherein the logic gate circuit comprises a NOR logic gate and the connected pin is connected with a pull-up resister that is further connected to a voltage source Vcc, in which the connected pin is originally grounded with respect to the printer so that when the joystick is connected to the printer connector, the connected pin has a high voltage level.

8. The printer interface device of claim 7, wherein the at least one connected pins comprises an $18^{th}$ pin and a $25^{th}$ pin of the printer connector.

9. The printer interface device of claim 1, wherein the joystick can be replaced by other similar products by properly select the connected pins to produce the MODESEL and accordingly replacing the joystick interface.

10. A dual purpose printer interface device, which is suitable for use of a printer or an additional periphery device to connect to a portable computer, the dual purpose printer interface device comprising:

a printer connector for connecting the printer or the joystick, wherein the additional periphery device is connected to the printer connector through a connection adapter;

a printer interface, used to transmit data and instruction signals from the computer to the printer for printing, and transmit a printer status signal responded by the printer to the computer;

an additional interface with respect to the additional periphery device, used to receive signals from the additional periphery device and transmit the signals to the computer;

a first selector, which is connected to the computer, the printer interface and the additional interface so as to select one of the printer or the additional periphery device to be connected to the computer according to a mode selection signal in which the first selector also receives the address control signals induced by the computer;

a second selector, which is connected to the printer connector, the printer interface, and the additional interface so as to connect the printer interface, and the additional interface to the printer connector according to the mode selection signal;

a mode selection circuit, which is connected to the printer connector at least one pin of the printer connector so as to automatically distinguish which one of the printer or the additional periphery device is connected to the printer connector through a voltage level of the connected pin and produce the mode selection signal (MODESEL) that is at least distributed to the first selector and the second selector of the selection device so as to switch the printer interface device into a printer operation mode or a additional periphery device operation mode; and an address-decoder-and-read/write-controller, used to receive instruction signals from the computer so as to respond control signals to the printer interface and the first selector.

11. The printer interface device of claim 10, wherein the first selector further comprises a first multiplexer and a switch circuit, in which the first multiplexer select one of the printer interface or the additional interface to be connected to the computer according to the MODESEL.

12. The printer interface device of claim 11, wherein the second selector comprises a second multiplexer and a third multiplexer, in which the second multiplexer communicates with the data transmitted and the additional interface, and the third multiplexer communicates with the printer control register and receives a power from a power generator, wherein when the MODSEL selects the printer operation mode, the second multiplexer transmits printer control signals outputted from the printer control register to the printer at the printer connector, and the third multiplexer transmits the data from the printer data register to the printer for printing, and when the MODSEL selects the additional periphery device operation mode, the second multiplexer receives the motion signals from the connected additional periphery device and transmits the motion signals to the additional interface, and the third multiplexer transfers the power to the additional periphery device through the printer connector.

13. The printer interface device of claim 12, wherein the mode selection circuit comprises a logic gate circuit connected to the at least one pin of the printer connector so as to automatically distinguish the printer or the additional periphery device when one of them is connected to the printer connector.

14. The printer interface device of claim 13, wherein the additional periphery device comprises a joystick and the additional interface comprises a joystick interface.

15. The printer interface device of claim 14, wherein the logic gate circuit comprises a NOR logic gate and the connected pin is connected with a pull-up resister that is further connected to a voltage source Vcc, in which the connected pin is originally grounded with respect to the printer so that when the additional periphery device is connected to the printer connector, the connected pin has a high voltage level.

16. The printer interface device of claim 15, wherein the at least one connected pins comprises an $18^{th}$ pin and a $25^{th}$ pin of the printer connector.

17. The printer interface device of claim 16, the connection adapter for the joystick comprises a converting relation:

Vcc:(1,8,9, 15):(1, 14, 15, 16, 17); V0:3:2; V1:6:3; V2:11:4;

V3:13:5; V4:2:6; V4:2:6; V5:7:7; V6:10:8; and V7:14:9, where a first set of parameter represents a signal line, a second set of parameter represents a contact-pin sequence number of the joystick, and a third set of parameter represents a contact-pin sequence number of the printer connector.

* * * * *